M. M. DEEM.
HANDLE BAR.
APPLICATION FILED MAR. 17, 1915.
1,146,692.
Patented July 13, 1915.
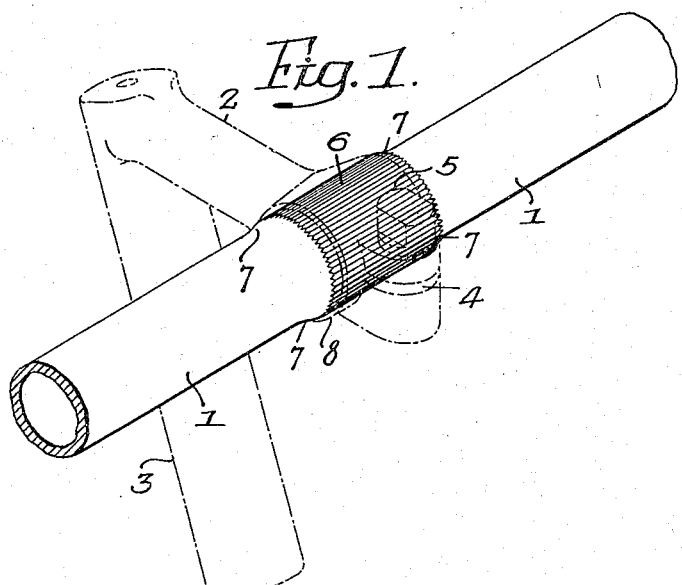
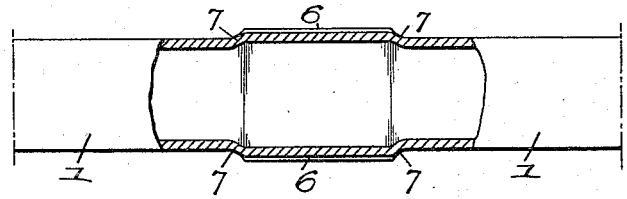
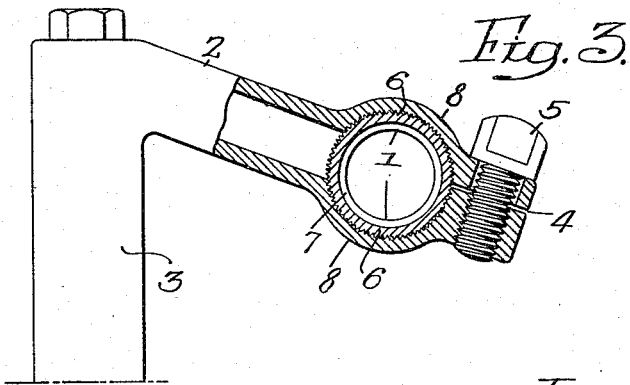
Witnesses:—
Charles H. York.
Wills & Simones
Inventor:—
Miller M. Deem,
by his Attorneys,—
Howson & Howson

UNITED STATES PATENT OFFICE.

MILLER M. DEEM, OF READING, PENNSYLVANIA, ASSIGNOR TO AMERICAN SKATE & MANUFACTURING COMPANY, OF READING, PENNSYLVANIA, A CORPORATION OF PENNSYLVANIA.

HANDLE-BAR.

1,146,692.      Specification of Letters Patent.      Patented July 13, 1915.

Application filed March 17, 1915. Serial No. 14,968.

*To all whom it may concern:*

Be it known that I, MILLER M. DEEM, a citizen of the United States, residing in Reading, Berks county, State of Pennsylvania, have invented certain Improvements in Handle-Bars, of which the following is a specification.

My invention relates to detail improvements in bicycle construction, and one object thereof is to provide a novel and inexpensive form of handle bar body particularly designed for connection to a steering post, the construction being such as to cause such connection of parts to be rigid and that without appreciably weakening either the post or the handle bar.

A further object of the invention is to provide a handle bar with a novel form of tubular enlargement designed to fit into the tubular head of a steering post, the construction of said enlargement being such that it shall reinforce rather than weaken the handle bar and will permit the steering post to be tightly clamped to it.

These objects and other advantageous ends I secure as hereinafter set forth, reference being had to the accompanying drawings in which, Figure 1 is a perspective view showing a handle bar constructed according to my invention; and Figs. 2 and 3 are elevations, partly in section, further illustrating the detail construction of said invention.

In the above drawings 1 represents the portion of a bicycle handle bar which is to be clamped in the tubular head 8 of the arm 2 which projects from the upper extremity of the steering post 3. For this purpose said head is provided with a slot or split 4 running from its extremity into its passage or cavity and the two parts of said extremity are connected by a bolt 5 designed to decrease at will the diameter of said passage which is internally ribbed parallel with its axis, by the use of a suitable broach. That portion of the handle bar intended to fit within this cylindrical passage of the head is made in the form of a centrally placed cylindrical enlargement or swelling 6 pressed outwardly from the body of the handle bar by suitable means and is characterized by the fact that its external cylindrical surface is not only substantially concentric with the longitudinal axis of the bar but has its walls of substantially the same thickness as those of the remainder or body of said bar. Obviously this enlargement 6 is integral with the remainder of the tube and is connected thereto by integrally inclined portions or necks the thickness of whose walls is the same as or but slightly less than, those of said enlargement and of the body.

The external cylindrical surface of the enlargement 6 is knurled or otherwise formed so that it has a series of closely spaced ribs extending parallel with its axis, which not only serve as a gripping surface but aid in stiffening or reinforcing this swelling of the handle bar. In forming these ribs the metal of the enlargement 6 is not cut away but is so acted on by suitable tools that its cross sectional area is the same as that of the metal in the body of the handle bar. There is thus no lessening of the structural strength of said bar either in its enlarged portion 6 or at the necks 7 between said enlargement and the body, so that there is consequently no likelihood of breakage at these points.

Another important feature of my improved construction resides in the accurate fit of the ribbed enlargement 6 within the passage of the head 8 so that a relatively slight turning of the bolt 5 will cause the entire surface of said passage to grip the external cylindrical surface of the handle bar for practically its entire area and thus effectually prevent slipping of said bar relatively to the steering post after this bolt has been set up.

It is further to be noted that the handle bars constructed according to my invention may be inexpensively made and under conditions of use are substantial as well as reliable and durable.

I claim:—

1. A handle bar consisting of a metallic tube having an integral enlargement for attachment to a steering post; the external surface of said enlargement being accurately cylindrical.

2. A handle bar consisting of a metallic tube having an integral enlargement formed with an accurately cylindrical surface, the walls of the enlargement and of the integral necks connecting it to the body of the handle bar being uniform in thickness with that of said body.

3. A handle bar consisting of a metallic tube having at its middle an accurately cylindrical integral portion of a diameter greater than that of the immediately adjacent parts, there being inclined neck portions connecting the ends of said cylindrical portion with the body parts of the bar, and made of the same thickness as the body and the cylindrical portion.

4. A handle bar consisting of a metallic tube having an integral substantially cylindrical enlargement for attachment to a steering post, the external surface of said enlargement being formed with a series of ribs running parallel with its longitudinal axis.

5. A handle bar consisting of a metallic tube having an integral substantially cylindrical enlargement for the attachment of a steering post, the external surface of said enlargement being knurled.

6. A handle bar consisting of a metallic tube having an integral externally cylindrical enlargement for attachment to a steering post, the walls of said enlargement being of substantially the same thickness as those of the remainder of the tube.

7. A handle bar consisting of a metallic tube having a portion for the attachment of a steering post, in the form of an integral external cylindrical enlargement having longitudinally extending ribs, the cross sectional area of the metal in said enlargement being substantially the same as that of the metal in the body.

In testimony whereof, I have signed my name to this specification, in the presence of two subscribing witnesses.

MILLER M. DEEM.

Witnesses:
  OSCAR WANNER,
  M. LINCOLN.

Copies of this patent may be obtained for five cents each, by addressing the "Commissioner of Patents, Washington, D. C."